Figure 1:
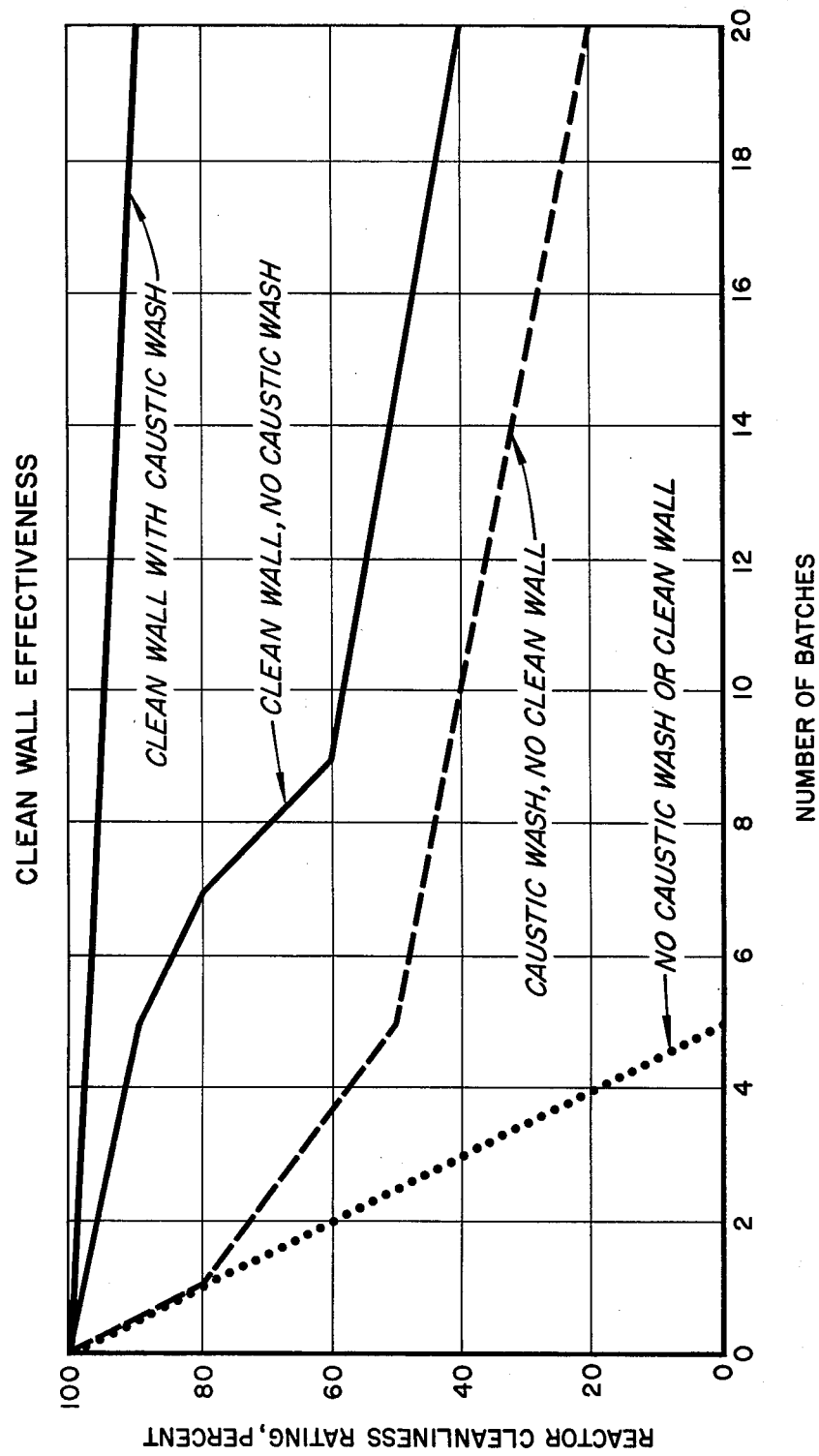

United States Patent [19]

Weimer et al.

[11] 4,145,496
[45] Mar. 20, 1979

[54] PREVENTION OF PVC POLYMER BUILDUP IN POLYMERIZATION REACTORS USING OXALYL BIS(BENZYLIDENEHYDRAZIDE) AND ALUMINA

[75] Inventors: Dean R. Weimer, Ponca City; Kenneth D. Freshour, Oklahoma City, both of Okla.

[73] Assignee: Continental Oil Company, Ponca City, Okla.

[21] Appl. No.: 921,647

[22] Filed: Jul. 3, 1978

[51] Int. Cl.² ............................................. C08F 2/18
[52] U.S. Cl. ...................................... 526/62; 526/74
[58] Field of Search .................................... 526/74, 62

[56] References Cited

U.S. PATENT DOCUMENTS 4,068,052  1/1978  Weimer et al. ........................ 526/74

FOREIGN PATENT DOCUMENTS 2224144  11/1973  Fed. Rep. of Germany.

Primary Examiner—John Kight, III
Attorney, Agent, or Firm—Cortlan R. Schupbach, Jr.

[57] ABSTRACT

Polymer buildup in polymerization reactions during vinyl chloride polymerizations is greatly reduced by applying a water dispersion of alumina and oxalyl bis(-benzylidenehydrazide) (OABH) to the reactor surfaces exposed to the polymerization medium prior to carrying out the polymerization. Long term effects of the buildup preventor can be obtained by applying a caustic wash to the reactor walls, prior to applying the oxalyl bis(benzylidenehydrazide) and alumina dispersion. The effect of the OABH/alumina and caustic is synergistic since the preventative effect is greater than either material used alone.

9 Claims, 1 Drawing Figure

PREVENTION OF PVC POLYMER BUILDUP IN POLYMERIZATION REACTORS USING OXALYL BIS(BENZYLIDENEHYDRAZIDE) AND ALUMINA

This invention relates to a process for decreasing polymer buildup during suspension polymerizations. More specifically, this invention relates to suppressing the growth of polymer on reactor surfaces in contact with the reaction medium which results in reactor fouling during the polymerization of polyvinyl chloride. The decrease in reactor fouling is obtained by coating the reactor, prior to the polymerization charge, with oxalyl bis (benzylidenehydrazide) (OABH) and alumina dispersions. A synergistic effect is seen in applying a caustic pre-wash to the reactor prior to applying the OABH alumina dispersion.

Reactor fouling during the polymerization of vinyl chloride polymers and copolymers has long been known as a severe problem in the art. Many methods have been attempted to overcome this problem. Among these methods are glass-lined reactors and reactors which are mirror smooth in finish in order to provide little purchase for polymerization adhesion. However, these methods have in general not been effective since eventually polymer build-up does occur in the reactor which must be removed. When removal is by mechanical means, scratches and imperfections are made on the reactor surfaces forming sites for fouling to begin in subsequent polymerizations.

Reduction of fouling has been attempted using many means such as aluminum reactor with oxidized interiors as described in U.S. Pat. No. 3,201,378, and the use of coating materials on reactor surfaces such as found in U.S. Pat. Nos. 3,926,910 and 3,669,946. These materials are normally sprayed or wiped onto the reactor surface before charging or added to the reactor medium shortly after polymerization has begun in order to prevent or reduce fouling at the reactor wall. These methods are usually not acceptable either because the amount of fouling reduced is not sufficient to provide a significant benefit, or if sufficient, modifies the physical properties of the resin to an undesirable extent.

In particular, some references describe the use of oxylate additions or hydrazine additions or coatings. Japan Pat. No. 75/112,483 discloses the use of hydrazine hydrate to the polymerization charge. This material is much more toxic material than the oxalyl bis(benzylidenehydrazide) of the instant invention and in addition is added to the polymer charge rather than as a pre-coat. Japan Pat. No. 75/139,886 describes the use of oxalic acid and metal salts of oxalic acid.

The use of base additions or washes is also known in the art. For example, German Offenlegungsschrift No. 2,208,796 involves the addition of caustic to the polymerization charge with the resultant pH increase. German Offenlegungsschrift No. 2,224,144 describes a continuous spraying of caustic on the reactor walls. German Offenelegungsschrift No. 2,618,634 describes the use of a polymeric coating containing caustic which is an economically expensive method of treatment and hence not desirable. In addition, many other references are available which teach coating the reactor walls with dyes or pigments, all of which would have adverse affect on resin properties, particularly color. Finally, U.S. Pat. No. 3,778,423 teaches the use of alphamethyl styrene as a wall coating. This is an effective method as this material is a free radical inhibitor. However, production penalties are encountered because of much increased polymerization time. U.S. Pat. No. 4,068,052 describes the use of dithiooxamide/aluminum mixtures to prevent buildup, but these materials are mildly toxic and often cause polymer odor and extrusion which is unacceptable for many applications.

It is therefore desirable that a method be devised to prevent reactor fouling and buildup without significantly altering the properties of the polymer while retaining the use of conventional reactors.

It is therefore an object of the instant invention to provide a method for reducing reactor fouling during the suspension polymerization of vinyl chloride monomer to form polymers and copolymers. Other objects will become apparent to those skilled in this art as the description proceeds.

It has now been discovered that small amounts of oxalyl bis(benzylidenehydrazide) (OABH) in combination with alumina applied as a dispersion will prevent reactor fouling or polymer buildup when introduced directly onto reactor surfaces in contact with the reaction medium prior to charging the reactor and carrying out the polymerization. In addition, it has been discovered that a synergistic effect exists not only between alumina and OABH, but also between the dispersion described and a caustic prewash, which allows reactor cleanliness for almost unlimited periods of time.

The aluminas useful in the practice of the instant invention are those which can be dispersed in water. An example of such aluminas are DISPAL-M and CATAPAL-SB trademarks of and sold by Continental Oil Company. In the practice of the instant invention the alumina is placed is a dispersion suitable for wiping or spraying onto reactor walls. Such a dispersion can be made by any of several known methods. Water is a useful solvent or water including acid such as hydrochloric, nitric, acetic, and chloroacetic can be used to disperse the alumina. Such dispersions can also be prepared using salts to disperse the alumina. Such salts are dry blended as a solid before the dissolution or added to water prior to alumina. From about 0.1% to 50% by weight based upon the weight of alumina of a salt compound can be used. Representative examples of such dispersants are aluminum nitrate hydrate, ferric chloride, ferric chloride hexahydrate, soluble chromic chloride, chromic chloride hydrates, chromic nitrate hydrates, and ferric nitrate hydrates.

The dispersions can also contain materials such as acrylic polymers or small amounts of various surfactants. Basic materials such as ammonium hydroxide or sodium hydroxide can be added to the dispersion to raise the pH and increase the viscosity of the dispersion. Such increased viscosity gives better adherence to the reactor surfaces when operating but poorer results will be obtained with regard to reduction of fouling. OABH is largerly insoluble in caustics and tends to aggregate, thus leading to incomplete coverage. Addition to caustics would therefore normally not be used. Surprisingly, no synergism between OABH/alumina and caustic was noted when this method of application was used.

The alumina is used only in combination with oxalyl bis(benzylidenehydrazide) (OABH) in order to obtain the benefits of the synergism between the two materials. Thus a water dispersion of alumina and OABH applied to the reactor surface prior to charging the reactor and carrying out the polymerization almost completely eliminates vinyl chloride polymerization polymer buildup. The effect of the two in combination yields a synergism over the individual elements when used alone.

The dispersion is prepared first by making the alumina dispersion by the known methods set forth above. However, for the purposes of the instant invention the preferred method is dispersing the alumina in water containing hydrochloric or acetic acid. OABH is then stirred into the alumina dispersion. Upon standing, the OABH will separate from the mixture but is easily redispersed with moderate stirring when use is desired. Dispersions are more stable when a solvent suitable for OABH such as N-methyl-2-pyrrolidone is used.

The alumina content in the mixture can vary from about 2 to about 10 weight percent with the preferred level being from about 4 to about 6 weight percent. The OABH content can vary from about 0.05 to about 3.0 weight percent with the preferred level being from about 0.1 to about 0.5 weight percent based on total weight of clean wall formula.

In the practice of the instant invention application can be made to the reactor interior surfaces by any one of a number of known methods such as spraying, wiping, and so forth. One method would be to form a vacuum in the reactor when empty and then releasing the solution into the reactor where it will immediately atomize into a fine dispersion and completely coat the interior surfaces. Normally, when spraying or wiping the solution on the reactor surfaces, any excess would be allowed to drain away, but removal of excess is not critical. It should be noted that the materials described in the instant invention can not be added to the reactor ingredients and prevent polymer buildup. It is essential that the reactor interior in contact with the polymerization medium be completely coated prior to charging the reactor and carrying out the reaction.

In practice a caustic wash will normally be applied to the reactor interior surfaces prior to applying the alumina OABH dispersion of the instant invention. It has been found that the application of the caustic wash to the reactor walls prior to the second coating with the material of the instant invention provides excellent longterm effects which, for practical purposes, eliminate polymer buildup on the reactor interiors.

Caustic wash alone containing from 5 to 20% sodium hydroxide has been used in the past to prevent polymer buildup. This wash, when carried out without the addition of the OABH-alumina dispersion coating, was not effective in preventing polymer buildup, but did slow such buildup. It is therefore apparent that a synergistic effect occurs between the caustic prewash and the dispersion described herein to prevent fouling. The exact mechanism of this synergism is not fully understood but such a synergism clearly exists from the data results.

An improved method of the instant invention has been extensively tested in pilot plane scale reaction runs and found to be very effective. The normal procedure used prior to carrying out the polymerization of each batch is as set forth below.

Initially, the antifouling formula of the instant invention and the caustic prewash are prepared. Normally, the antifouling composition will be prepared according to the following specific example. CATAPAL-SB alumina, (trademark of and sold by Continental Oil Company,) 5.05 weight percent; acetic acid 0.90 weight percent; OABH 0.25 weight percent; water 93.80 weight percent; all percentages being based upon the entire antifouling formula. A caustic wash is simply a 5% aqueous solution of sodium hydroxide or other suitable base.

At the conclusion of a polymerization batch a procedure approximating the following is used.
(1) An ambient water rinse is applied to the condenser and the reactor.
(2) The caustic wash is applied at 180° F. to the condenser and to the reactor. This can be carried out simultaneously.
(3) A 180° F. water rinse is applied to the reactor.
(4) An examination of the reactor is made. In the examples which follow, after each hot water rinse the reactor was opened and inspected visually. Photographs of the results were normally taken. Inspection of the condenser was usually carried out only about every 6 months.
(5) After the examination the reactor was rinsed with the clean-wall formula disclosed for approximately 1 minute. No formula was applied to the condenser, but such application could be carried out if desired.
(6) The reactor was charged and polymerization was carried out.

In the experiments described, a clean-wall evaluation consisted of a set of five runs. After the set was complete, the results were compared to previous work. A scale of 0 to 10 was used wherein 0 denotes no buildup and 10 denotes no treatment.

It should be noted that all rinses were sprayed on the reactor and condenser surfaces with the drain open. Approximately 1 to 2 pounds of the OABH/alumina dispersion remain on the reactor surfaces. However, due to the subsequent hot water rinse, only caustic residuals remain from the caustic prewash. These, however, are entirely sufficient to yield the synergistic effect discovered using the instant combination of materials.

The invention is more concretely described with reference to the examples below wherein all parts and percentages are by weight unless otherwise specified. The examples are intended to illustrate the instant invention and not to limit it.

Comparative examples were carried out. The reactor and condenser were contacted with the caustic wash. The anti-fouling agent of the instant invention was then applied to the reactor. The reactor was then evacuated to 49 mm mercury, charged with cold water and monomer in a 1.2 to 1.0 water/monomer weight ratio. The charge was an 1167 gallon total (pilot plant scale) at 134° F. Seventeen percent recovered vinyl chloride monomer was added. 0.055 parts per hundred monomer (phm) monomer colloid and 0.049 parts per hundred initiator (L-223 di-(2 ethylhexyl) peroxydicarbonate, trademark of and sold by Lucidol division of Pennwalt Corp.) The initiator was injected at 120° F. Polymerization was carried out at a charge temperature of 134° F. The reaction was stopped at 90 psig with 0.03 parts per hundred monomer alphamethyl styrene.

The evaluations of various methods of reducing fouling were carried out. Among such methods was that described in U.S. Pat. No. 4,068,052 which is extremely effective in reducing PVC polymer buildup, but utilizes a fairly toxic dithiooxamide material and which has been known to cause polymer odor and extrusion color. A controlled set was carried out using no antifouling measures whatsoever, followed by a caustic wash in conjunction with DTO/alumina; and caustic wash-OABH/alumina; and caustic wash alone. The results are set forth in the table 1 below, wherein a clean reactor is rated as 0 and the control with no clean wall precautions rated 10.

TABLE 1

| Treatment | Rating |
|---|---|
| None | 10.0 |
| Caustic Wash | 5.0 |
| DTO/Alumina Formula and Caustic Wash | .1 |
| OABH/Alumina Formula and Caustic Wash | .1 |

Examples 2-5 are carried out in an 8 gallon reactor using the following formulation.

| | |
|---|---|
| Deionized water | 36 lbs. |
| Methocel E15[1] | .115 phm |
| Lucidol 223$_2$M 75 wt % initiator | 13 g |
| Odorless Mineral Spirits (OMS) | 15 g |
| Vinyl Chloride Monomer (VCM) | 20 lbs. |

[1] Hydroxypropyl methyl cellulose, trademark of and sold by Dow Chemical Co.
[2] di-(2-ethylhexyl) peroxydicarbonate, trademark of and sold by Lupersol Co.

No caustic was used prior to the clean-wall formulation. After the OABH/alumina dispersion had been sprayed on the reactor surfaces, the water, Methocel E15, initiator, and OMS were charged to the reactor. The reactor was sealed and evacuated for 15 minutes. Stirring was begun, vinyl chloride monomer was added, and the reactor contents were heated to 130° F. and maintained until the reactor pressure dropped to 90 psig. At this point approximately 85% of the vinyl chloride had polymerized. The reactor was then emptied and rinsed with water. The baffle was removed and examined for the amount of buildup. Buildup was again rated from 0 to 10 with 0 being no buildup and 10 being the amount of buildup from a standard control run with no clean wall spray.

EXAMPLE 1

No coating was used for this polymerization.

EXAMPLE 2

The coating applied to the reactor wall contained 5 weight percent alumina dispersed with acetic acid and 0.125 weight percent OABH.

EXAMPLE 3

The clean-wall coating contained 5 weight percent alumina dispersed with acetic acid and 0.187 weight percent OABH.

EXAMPLE 4

The coating contained 5 weight percent alumina dispersed with acetic acid and 0.25 weight percent OABH. The results of these experiments are shown in Table 2 below. Because of the small reactor size and different reaction system, the 0 to 10 rating system gave different results than the pilot plant trials, but the superiority of the instant invention is clearly evident.

Table 2

| Example | Rating |
|---|---|
| 1 | 10 |
| 2 | 2 |
| 3 | 1 |
| 4 | 0.2 |

The advantage of the instant invention is graphically illustrated when reference is made to FIG. 1 which shows the various effects over several batches of the instant invention as compared to the prior art. In FIG. 1 the amount of buildup when no antifouling measures are taken is shown. This is compared to caustic wash alone, (sodium hydroxide at 5% concentration), applied to the reactor prior to applying the polymerization charge. The FIGURE also shows OABH/alumina combination without the caustic precoat. The FIGURE clearly shows the effect of a caustic prewash followed by second rinse of OABH and alumina. It is clear from an examination of the FIGURE that a synergism does exist when a caustic prewash is used prior to the application of OABH/alumina dispersion, although the mechanism is not understood.

The FIGURE also shows the diminishing effectiveness of a clean-wall formulation of OABH and alumina when used without intermittent caustic wash. In the FIGURE an effectiveness rating of 100 indicates an immaculate reactor while 0 indicates fouling encountered in a reactor when no buildup prevention was used.

The caustic prewash can be carried out between every batch if desired but usually is not necessary more often than every third to every eighth batch depending upon the amount of buildup encountered. Under some conditions a prewash need be carried out only about every tenth polymerization.

The caustic will normally be used in a concentration of from 3 to about 30% by weight. Concentrations as low as from 3 to 6% can be used but concentrations of from 4 to 20% are most useful.

The caustic can be selected from materials which effectively promote the antifouling effect of the OABH alumina dispersions. Representative examples of such caustic materials are potassium hydroxide, sodium hydroxide, lithium hydroxide, magnesium hydroxide, cesium hydroxide and francium hydroxide. However, these examples are not exhaustive and other compounds will be effective. Such effectiveness can be demonstrated by simply using them in the manner described.

The anti-fouling materials of the instant invention are most effective when applied evenly and completely over all reactor surfaces in contact with the reaction medium. It is therefore preferred to use a suitable solvent to solubilize the OABH in order to provide uniform coverage. Any OABH solvent which is not detrimental to the reactor, the polymerization and the polymeric product can be used, but N-methyl-2-pyrrolidone has been found to be very effective. The use of solvent additionally aids in application of the anti-fouling materials to the reactor. Such a solvent would normally be present in amounts ranging from about 2.0 to 6.0% based on total formula weight. The solvent in which OABH is dissolved prior to adding to the alumina dispersion, eg, N-methyl-2-pyrrolidone, does not solubilize the alumina. The solution of N-methyl-2-pyrrolidone and OABH is added to the alumina dispersion prior to use on reactor surfaces.

The instant invention prevents polymer buildup on reactor surfaces for suspension polymerization systems containing initiators, emulsifiers and other additives known to the art. Representative examples of initiators are diisopropyl peroxy dicarbonate, di-(2-ethylhexyl)-peroxydicarbonate, tert-butyl peroxyneodecanoate, and disecbutyl peroxydicarbonate as well as peroxide initiators such as acetylperoxide and lauryl peroxide.

The physical properties of the polymers produced by the methods of the instant invention are very comparable to those polymers produced from reactors using no wall coatings to prevent reactor fouling. Table 3 compares polymerizations carried out using the caustic wash alone with the method of the instant invention. All reactions were the same, changing only the anti-fouling system used. All batches were made in pilot plant equipment.

nation with a caustic pre-wash, allows production of high quality PVC without reactor fouling.

While certain embodiments and details have been shown for the purpose of illustrating this invention, it will be apparent to those skilled in this art that various changes and modifications may be made herein without departing from the spirit or scope of the invention.

Table 3
RESIN PROPERTIES

| Test | Clean Wall Type | Bulk Density lbs/ft³ | Specific Viscosity | Particle Size Distribution | | | | | | | Gels | Dry Time min. | Gardner color L a b | Oven Heat Stability | | |
|---|---|---|---|---|---|---|---|---|---|---|---|---|---|---|---|---|
| | | | | 40 | 60 | 80 | 100 | 140 | 200 | Pan | | | | YP | PB | BP |
| 1 | Caustic Wash | 32.7 | .369 | 0.1 | 12.4 | 33.8 | 12.6 | 25.8 | 12.3 | 2.9 | 10 | 5.4 | 99.4 + 0.5 + 2.0 | 3 | 3 | 3 |
| 2 | Caustic Wash | 32.4 | .367 | 0.1 | 15.8 | 31.7 | 11.8 | 24.9 | 12.9 | 2.7 | 0 | 5.5 | 99.2 + 0.7 + 2.0 | 2.5 | 3 | 3 |
| 3 | Caustic Wash | 32.6 | .369 | 0.3 | 14.5 | 28.9 | 11.1 | 25.6 | 15.4 | 3.9 | 3 | 5.5 | 99.1 + 0.7 + 2.0 | 2.5 | 3 | 3 |
| 4 | Caustic Wash | 32.1 | .374 | 0.1 | 9.3 | 35.5 | 13.4 | 26.9 | 12.3 | 2.4 | 10 | 5.5 | 99.7 + 0.4 + 1.6 | 2.5 | 3 | 3.5 |
| 5 | Caustic Wash | 32.3 | .372 | 0 | 6.3 | 35.2 | 13.8 | 29.1 | 12.8 | 3.1 | 3 | 5.4 | 99.9 + 0.4 + 1.7 | 3 | 3 | 3.5 |
| 6 | OABH/Al | 30.1 | .368 | 0.9 | 10.3 | 16.8 | 10.7 | 42.2 | 17.4 | 1.5 | 6 | 5.4 | 99.6 + 0.5 + 1.6 | 2.5 | 2.5 | 2.5 |
| 7 | OABH/Al | 32.6 | .368 | 0 | 10.2 | 32.1 | 12.5 | 28.0 | 14.3 | 2.8 | 104 | 5.5 | 99.7 + 0.4 + 1.6 | 2.5 | 2.5 | 2.5 |
| 8 | OABH/Al | 32.4 | .368 | 0.1 | 13.8 | 33.1 | 11.5 | 24.7 | 13.1 | 3.7 | 27 | 5.5 | 99.5 + 0.5 + 1.8 | 2.5 | 2.5 | 3 |
| 9 | OABH/Al | 32.3 | .368 | 0 | 10.0 | 35.0 | 12.2 | 26.0 | 13.1 | 3.4 | 32 | 5.4 | 99.5 + 0.5 + 1.8 | 2.5 | 2.5 | 3 |
| 10 | OABH/Al | 32.3 | .368 | 0.2 | 15.6 | 32.5 | 11.9 | 24.5 | 12.5 | 2.8 | 11 | 5.3 | 99.3 + 0.5 + 1.8 | 2.5 | 2.5 | 3 |
| 11 | Both | 31.4 | .377 | 0.6 | 21.4 | 30.9 | 10.9 | 21.9 | 11.6 | 1.9 | 46 | 4.7 | 98.3 + 0.0 + 2.3 | 3 | 3 | 3 |
| 12 | Both | 31.8 | .377 | 0 | 13.1 | 32.4 | 11.6 | 26.8 | 13.2 | 2.4 | 73 | 5.4 | 98.7 − 0.1 − 2.0 | 3 | 3 | 3 |
| 13 | Both | 31.9 | .374 | 0.3 | 18.5 | 32.4 | 11.5 | 24.6 | 10.9 | 1.5 | 16 | 5.5 | 98.7 − 0.1 − 2.1 | 3 | 3 | 3 |
| 14 | Both | 31.7 | .374 | 0.8 | 20.5 | 30.3 | 10.9 | 23.7 | 11.4 | 1.8 | 18 | 5.5 | 98.6 − 0.1 − 2.1 | 3 | 3 | 2.5 |
| 15 | Both | 31.7 | .377 | 1.1 | 21.7 | 29.1 | 10.4 | 22.9 | 12.2 | 2.0 | 48 | 5.5 | 98.6 − 0.1 − 2.1 | 3 | 3 | 3 |

The gels were measured by milling a flexible compound containing black colorant, then counting the number of translucent particles in a 6"×6' portion of the milled sheet when viewed over a diffused light source.

The Gardner color reported in the table is the well known Gardner color test where (a) is an expression of the dominant colors of red (if positive) and/or green (if negative), and b is is an expression of the dominant colors of yellow (if positive) and/or blue (if negative). Intensity of any color is indicated by the magnitude of the numerical value regardless of sign, based on MgO standard given the value of 0.0. The value L is a comparison of the reflectance of the resins involved and is not compared to a standard.

Oven heat stabilities were tested by milling a flexible formulation containing the experimental resin, then subjecting portions of the milled sheet to an oven temperature of 365° F. The portions are removed from the oven at 15 minute intervals and compared to those made with a control resin.

The oven heat stability data is a comparison of the experimental resins to standard control resin, where:

YP denotes the appearance of yellow color compared to the appearance of yellow color with the control resin. The number 3 denotes equal time while a lower number indicates later yellow color appearance and better heat stability;

PB denotes the appearance of preblack color compared to the appearance of preblack color with the control resin. The number 3 denotes equal time while a lower number indicates better results;

BP denotes the appearance of black color compared to the appearance of black color with the control resin. The number 3 denotes equal time while a lower number indicates better results.

Thus it is apparent that the OABH/Al of the instant invention, whether used alone or in synergistic combi-

We claim:

1. A method for preventing polymer fouling of reactor surfaces in contact with the polymerization medium during the polymerization of vinyl chloride monomer to produce PVC comprising the steps of
   (1) contacting the affected reactor surfaces with a water dispersion of oxalyl bis(benzylidenehydrazide) and alumina prior to
   (2) charging the reactor and carrying out the reaction.

2. A method as described in claim 1 wherein a caustic solution is applied to reactor surfaces prior to contacting with said water dispersion.

3. A method as described in claim 2 wherein the caustic is an alkali or alkaline earth in aqueous solution.

4. A method as described in claim 3 wherein the caustic is selected from the group consisting of sodium hydroxide, potassium hydroxide, lithium hydroxide, magnesium hydroxide and cesium hydroxide.

5. A method as described in claim 4 wherein the caustic is sodium hydroxide and is present in the solution in a concentration of from about 3 to about 30% by weight based upon the total weight of the caustic rinse solution.

6. A method as described in claim 5 wherein the caustic rinse is carried out prior to alternate polymerization.

7. A method as described in claim 5 wherein the caustic rinse is carried out prior to at least every 10th polymerization.

8. A method as described in claim 2 wherein oxalyl bis(benzylidenehydrazide) is dissolved in a solvent prior to addition to the alumina dispersion in the preparation of water dispersion of oxalyl bis(benzylidenehydrazide) and alumina.

9. A method as described in claim 8 wherein said solvent is N-methyl-2-pyrrolidine.

* * * * *